US012669938B2

(12) United States Patent
Dreyer et al.

(10) Patent No.: US 12,669,938 B2
(45) Date of Patent: *Jun. 30, 2026

(54) SYSTEMS, METHODS, AND MEDIA FOR CONTROLLING BACKGROUND WEAR LEVELING IN SOLID-STATE DRIVES

(71) Applicant: SK hynix NAND Product Solutions Corp., Rancho Cordova, CA (US)

(72) Inventors: David G. Dreyer, Oronoco, MN (US); David J. Pelster, Longmont, CO (US); Mark Anthony Sumabat Golez, Folsom, CA (US); Bhargavi Govindarajan, Milpitas, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,759

(22) Filed: Nov. 27, 2024

(65) Prior Publication Data

US 2025/0094057 A1     Mar. 20, 2025

Related U.S. Application Data

(63) Continuation of application No. 18/090,347, filed on Dec. 28, 2022, now Pat. No. 12,223,172.

(51) Int. Cl.
*G06F 3/06* (2006.01)

(52) U.S. Cl.
CPC .......... *G06F 3/0613* (2013.01); *G06F 3/0653* (2013.01); *G06F 3/0679* (2013.01)

(58) Field of Classification Search
CPC .... G06F 3/0653; G06F 3/0679; G06F 3/0613; G06F 3/0616; G06F 3/0659; G06F 2212/1016
See application file for complete search history.

(56) References Cited

U.S. PATENT DOCUMENTS 5,479,633 A * 12/1995 Wells .................... G06F 3/0652
                                                    711/159
11,782,605 B2 * 10/2023 Golov ................... G06F 3/0659
                                                    711/103

(Continued)

FOREIGN PATENT DOCUMENTS

CN          102495806 A       6/2012
CN          110489360 A      11/2019

(Continued)

OTHER PUBLICATIONS

International Preliminary Report on Patentability dated Jul. 10, 2025 in International Patent Application No. PCT/US2023/085408, pp. 1-6.

(Continued)

*Primary Examiner* — Zhuo H Li
(74) *Attorney, Agent, or Firm* — Byrne Poh LLP

(57) ABSTRACT

Mechanisms for controlling background wear leveling are provided, including: increasing a first counter; comparing the first counter to a first threshold; and in response to the first counter meeting the first threshold: decreasing the first counter by a value of the first threshold; and triggering background wear leveling. In some embodiments, the first counter is increased in response to receiving a write trigger. In some embodiments, the first threshold is based upon a page size and a number of planes of physical media of an SSD. In some embodiments, the mechanisms further comprise: incrementing a second counter in response to receiving a host write trigger; comparing the second counter to a second threshold; and in response to the second counter meeting the second threshold, decreasing the second counter by the second threshold, wherein the increasing the first counter is performed in response to the second counter meeting the second threshold.

24 Claims, 6 Drawing Sheets

(56)            References Cited

U.S. PATENT DOCUMENTS

| | | | |
|---|---|---|---|
| 12,223,172 B2 * | 2/2025 | Dreyer | G06F 3/0616 |
| 2013/0191700 A1 | 7/2013 | Griffin et al. | |
| 2014/0089565 A1 | 3/2014 | Lee et al. | |
| 2014/0237160 A1 | 8/2014 | Dong | |
| 2017/0300423 A1 | 10/2017 | Kamruzzaman | |
| 2019/0065057 A1 * | 2/2019 | Wakchaure | G06F 3/0655 |
| 2020/0143871 A1 | 5/2020 | Kim et al. | |
| 2020/0174677 A1 | 6/2020 | Golov | |
| 2021/0365202 A1 | 11/2021 | Shin et al. | |
| 2021/0406203 A1 | 12/2021 | Minopoli et al. | |
| 2023/0305712 A1 | 9/2023 | Kang | |

FOREIGN PATENT DOCUMENTS

| | | |
|---|---|---|
| CN | 112233715 A | 1/2021 |
| KR | 20170031052 | 3/2017 |

OTHER PUBLICATIONS

International Search Report and Written Opinion dated May 14, 2024 in International Patent Application No. PCT/US2023/085408, pp. 1-9.

Notice of Allowance dated Sep. 10, 2024 in U.S. Appl. No. 18/090,347, pp. 1-45.

Office Action dated Jun. 6, 2024 in U.S. Appl. No. 18/090,347, pp. 1-11.

Office Action dated Feb. 8, 2026 in CN Patent Application No. 202380094921.6, pp. 1-16.

\* cited by examiner

250

500

SYSTEMS, METHODS, AND MEDIA FOR CONTROLLING BACKGROUND WEAR LEVELING IN SOLID-STATE DRIVES

CROSS-REFERENCE TO RELATED APPLICATION

This application claims the benefit of U.S. patent application Ser. No. 18/090,347, filed Dec. 28, 2022, which is hereby incorporated by reference herein in its entirety.

BACKGROUND

Background wear leveling is a process used in solid-state drives (SSDs) that improves the life and the reliability of SSDs by spreading out wear evenly over different blocks of the SSDs. However, while an SSD is performing background wear leveling operations, the performance of the SSD as seen by a host of the SSD can be reduced.

Accordingly, new mechanism for controlling background wear leveling in solid-state drives are desirable.

SUMMARY

In accordance with some embodiments, new mechanism for controlling background wear leveling in solid-state drives are provided.

In some embodiments, systems for controlling background wear leveling are provided, the systems comprising: memory; and at least one processor coupled to the memory and collectively configure to at least: increase a first counter; compare the first counter to a first threshold; and in response to the first counter meeting the first threshold: decrease the first counter by a value of the first threshold; and trigger background wear leveling. In some of these embodiments, the first counter is increased in response to receiving a write trigger. In some of these embodiments, the first threshold is based upon a page size and a number of planes of physical media of a solid-state drive. In some of these embodiments, the at least one processor is also collectively configured to at least: increment a second counter in response to receiving a host write trigger; compare the second counter to a second threshold; and in response to the second counter meeting the second threshold, decrease the second counter by the second threshold, wherein the increasing the first counter is performed in response to the second counter meeting the second threshold. In some of these embodiments, the at least one processor is also collectively configured to at least: increment a third counter in response to receiving a defragmentation write trigger; compare the third counter to a third threshold; and in response to the third counter meeting the third threshold: decrease the third counter by the third threshold; and increase the first counter. In some of these embodiments, the third threshold is the same as the second threshold. In some of these embodiments, the comparing the first counter to the first threshold is performed in response to a passage of time.

In some embodiments, methods for controlling background wear leveling are provided, the methods comprising: increasing a first counter; comparing the first counter to a first threshold; and in response to the first counter meeting the first threshold: decreasing the first counter by a value of the first threshold; and triggering background wear leveling. In some of these embodiments, the first counter is increased in response to receiving a write trigger. In some of these embodiments, the first threshold is based upon a page size and a number of planes of physical media of a solid-state drive. In some of these embodiments, the methods further comprise: incrementing a second counter in response to receiving a host write trigger; comparing the second counter to a second threshold; and in response to the second counter meeting the second threshold, decreasing the second counter by the second threshold, wherein the increasing the first counter is performed in response to the second counter meeting the second threshold. In some of these embodiments, the methods further comprise: incrementing a third counter in response to receiving a defragmentation write trigger; comparing the third counter to a third threshold; and in response to the third counter meeting the third threshold: decreasing the third counter by the third threshold; and increasing the first counter. In some of these embodiments, the third threshold is the same as the second threshold. In some of these embodiments, the comparing the first counter to the first threshold is performed in response to a passage of time.

In some embodiments, non-transitory computer-readable media containing computer executable instructions that, when executed by a processor, cause the processor to perform a method for controlling background wear leveling, the method comprising: increasing a first counter; comparing the first counter to a first threshold; and in response to the first counter meeting the first threshold: decreasing the first counter by a value of the first threshold; and triggering background wear leveling. In some of these embodiments, the first counter is increased in response to receiving a write trigger. In some of these embodiments, the first threshold is based upon a page size and a number of planes of physical media of a solid-state drive. In some of these embodiments, the method further comprises: incrementing a second counter in response to receiving a host write trigger; comparing the second counter to a second threshold; and in response to the second counter meeting the second threshold, decreasing the second counter by the second threshold, wherein the increasing the first counter is performed in response to the second counter meeting the second threshold. In some of these embodiments, the method further comprises: incrementing a third counter in response to receiving a defragmentation write trigger; comparing the third counter to a third threshold; and in response to the third counter meeting the third threshold: decreasing the third counter by the third threshold; and increasing the first counter. In some of these embodiments, the third threshold is the same as the second threshold. In some of these embodiments, the comparing the first counter to the first threshold is performed in response to a passage of time.

DETAILED DESCRIPTION

Figure 1:
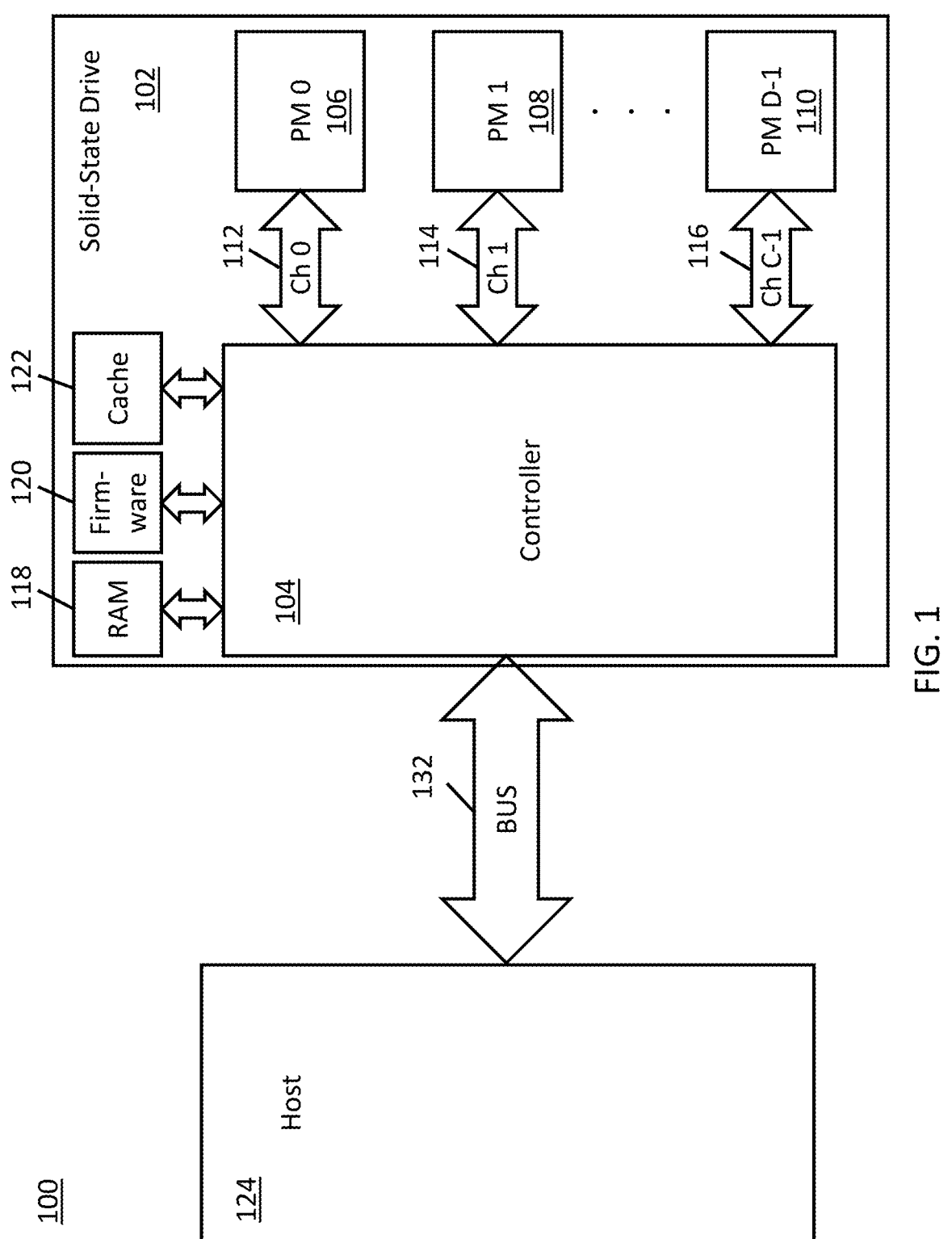
FIG. 1 is an example of block diagram of a solid-state drive coupled to a host device via a bus in accordance with some embodiments.

In accordance with some embodiments, mechanisms (which can include systems, methods, and media) for controlling background wear leveling in solid-state drives (SSDs) (such as NAND SSDs) are provided.

In some embodiments, in order to control background wear leveling, the mechanisms allocate defragmentation (which can also be referred to as garbage collection or reclamation) bandwidth via a credit mechanism. In some of these embodiments, credit is incremented at a rate that is proportional to a media policy requirement. Any suitable media policy requirement can be used in some embodiments. For example, in some embodiments, a media policy requirement that states a solid-state drive must guarantee that all blocks in the drive are within +/−10% of the average program/erase (PE) cycles on the drive can be used. Once enough credit is available to dispatch a background wear leveling operation (e.g., in which one page of valid data is moved from the source band to a target band), the background wear leveling operation is dispatched, and the consumed credit is decremented.

In some embodiments, these mechanisms use a "wear level rate" (WLR) which is a rate at which blocks need to be refreshed in order to satisfy a wear level media policy of an SSD. For example, in some embodiments, a WLR can be expressed as a ratio stating how often cold blocks (blocks that have been cycled less than some threshold) need to be cycled relative to hot blocks (blocks that have been cycled more than some threshold) to maintain a desired program/ erase (P/E) cycle gap. The WLR can be set in any suitable manner. For example, in some embodiments, the WLR can be set based upon the characteristics of the physical media with which an SSD implemented.

In some embodiments, these mechanisms can collect blocks into a logical construct called "bands," which get written and erased together and which adhere to the same wear leveling requirements.

The wear level rate indicates how many hot bands should be written for each cold band that is written. In some embodiments, this rate can be broken down to the smallest unit of write (NAND page), and if this rate is maintained at this smallest granularity, then it will also hold true that the rate is achieved at the larger block and band granularities.

For example, assume a wear level rate of 125 is selected (any suitable value can be used in some embodiments). If a bandwidth mix on an SSD is enforced that allows one page of cold data to be written for every 125 pages of hot data written, then once an entire band of cold data is written, it will be true that 125 bands of hot data have been written. And, thus, the wear level rate is achieved.

In some embodiments, a 10% margin to the wear level rate can be applied (i.e., wear level rate can be increased by 10%) to ensure the media policy requirement is met.

In accordance with some embodiments, these mechanisms can improve the IOPS stability metric (measure of the number of data points in a performance workload that are within +/−5% of the average performance) of SSDs.

A "wear level credit ratio" (WLCR) can be used in some embodiments to control background wear leveling in an SSD. The WLCR can be a linear function of the WLR. For example, a WLCR can be equal to a scaling factor (which can have any suitable value, including one, in some embodiments) multiplied by the WLR plus a margin (which can have any suitable value, including zero, in some embodiments) as follows:

$$WLCR=WLR*SF+M,$$

where SF is a scaling factor and M is a margin.

Turning to FIG. 1, an example block diagram of a solid-state drive 102 coupled to a host device 124 via a bus 132 that can be used to implement the mechanisms described herein in accordance with some embodiments is illustrated.

As shown, solid-state drive 102 can include a controller 104, physical media 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc.

Physical media 106, 108, and 110 can be any suitable physical media for storing information (which can include data, programs, and/or any other suitable information that can be stored in a solid-state drive) in some embodiments. The physical media can include any suitable memory cells, hardware processor(s) (such as a microprocessor, a digital signal processor, a microcontroller, a programmable gate array, etc.), interface controller(s), interface logic, drivers, etc. in some embodiments. While three physical media (106, 108, and 110) are shown in FIG. 1, any suitable number D of physical media (including only one) can be used in some embodiments. Any suitable type of physical media can be used in some embodiments. For example, in some embodiments, the physical media can be implemented using NAND flash memory, NOR flash memory, and/or any other suitable flash technology, phase change memory technology, and/or other any other suitable non-volatile memory storage technology. When using NAND flash memory, any suitable NAND technology can be used in some embodiments. For example, in some embodiments, NAND technologies such as single-level cell (SLC) NAND, multilevel cell (MLC) NAND, triple-level cell (TLC) NAND, quad-level cell (QLC) NAND, penta-level cell (PLC) NAND, or any NAND with suitable levels of cells. In some embodiments, the NAND can be 2D NAND or 3D NAND. Each physical media can have any suitable size in some embodiments.

Channels 112, 114, and 116 can be any suitable mechanism for communicating information between controller 104 and physical media 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiments, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

Bus 132 can be any suitable bus for communicating information (which can include data and/or programs in some embodiments), in some embodiments. For example, in some embodiments, bus 132 can be a PCIE bus, a SATA bus, or any other suitable bus.

Figure 2A:
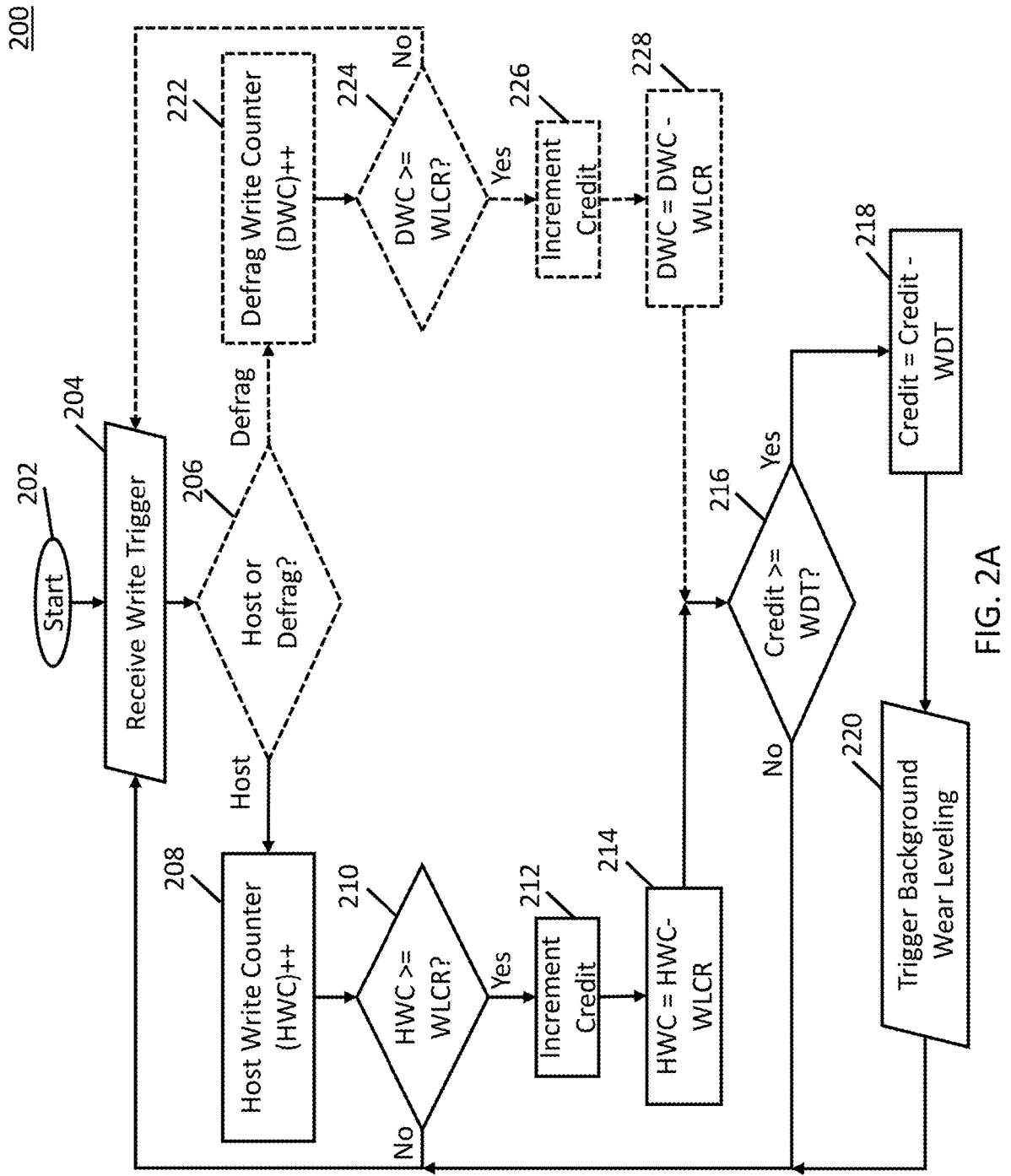
FIG. 2A is an example of a process for controlling background wear leveling based on a host write counter and/or a defrag write counter and a credit counter in response to receiving a write trigger in accordance with some embodiments.

Turning to FIG. 2A, an example 200 of a process to controlling background wear leveling in accordance with some embodiments is shown. In some embodiments, the process 200 can be modified by, for example, having steps rearranged, changed, added, and/or removed.

As illustrated, after process 200 begins at 202 (at which point the counters described below can be initialized to zero or any other suitable value, if not done already), the process waits for and receives a write trigger at 204. The write trigger can be any suitable indicator that a write is about to occur, has occurred, or is waiting to occur in some embodiments. The write trigger can be received from any suitable source, such as a host (such as host 124 of FIG. 1), in some embodiments.

Next, at 206, process 200 determines whether the write trigger is for a host write or a defragmentation write. This determination can be made in any suitable manner in some embodiments. For example, in some embodiments, host write data and defragmentation write data are written to separate bands, and the write trigger source can be determined by checking which band is being written to.

If it is determined at 206 that the write trigger is for a host write, then process 200 branches to 208.

At 208, process 200 increments a host write counter (HWC). Incrementing the HWC can be performed in any suitable manner in some embodiments. For example, in some embodiments, one can be added to the value of the HWC.

Then, at 210, the HWC is compared to a wear level credit ratio (WLCR). Any suitable WLCR can be used in some embodiments. For example, in some embodiments, the WLCR can be a linear function of the WLR, which can be set based upon the characteristics of the physical media with which an SSD implemented.

If it is determined at 210 that the HWC is less than (or less than or equal to) the WLCR, then process 200 loops back to 204 to wait for the next write trigger. Otherwise, if it is determined at 210 that the HWC is greater than or equal to (or greater than) the WLCR, then process 200 proceeds to 212.

At 212, process 200 increments a credit counter. Incrementing the credit counter can be performed in any suitable manner in some embodiments. For example, in some embodiments, one (or any other suitable value (that can be based on any suitable parameter) can be added to the value of the credit counter.

Next, at 214, process 200 decreases the HWC by the WLCR. Decreasing the HWC by the WLCR can be performed in any suitable manner in some embodiments. For example, in some embodiments, decreasing the HWC by the WLCR can be performed subtracting the WLCR from the HWC.

Then, at 216, the credit counter is compared to a write dispatch threshold (WDT). Any suitable WDT can be used in some embodiments. For example, in some embodiments, the WDT can be set based upon the page size and number of planes of the physical media with which an SSD is implemented. More particularly, for example, in some embodiments, for an SSD having NAND physical media have 16 kB page size and quad (4) planes, the WDT can be equal to 64.

If it is determined at 216 that the credit counter less than (or less than or equal to) the WDT, then process 200 loops back to 204 to wait for the next write trigger. Otherwise, if it is determined at 216 that the credit counter is greater than or equal to (or greater than) the WDT, then process 200 can proceed to 218.

At 218, process 200 decreases the credit counter by the WDT. Decreasing the credit counter by the WDT can be performed in any suitable manner in some embodiments. For example, in some embodiments, decreasing the credit counter by the WDT can be performed by subtracting the WDT from the credit counter.

Next, at 220, process 200 triggers background wear leveling. Background wear leveling can be performed in any suitable manner in some embodiments. For example, in some embodiments, background wear leveling can refresh cold blocks of the physical media of an SSD drive to increase their P/E cycle count relative to hot blocks of the SSD. The background wear leveling that is triggered can perform any suitable operation(s), in some embodiments. For example, in some embodiments, the background wear leveling can include moving one page of valid data from a source band to a target band.

If it is determined at 206 that the write trigger is for a defragmentation write, then process 200 branches to 222.

At 222, process 200 increments a defragmentation write counter (DWC). Incrementing the DWC can be performed in any suitable manner in some embodiments. For example, in some embodiments, one can be added to the value of the DWC.

Then, at 224, the DWC is compared to a wear level credit ratio (WLCR). Any suitable WLCR can be used in some embodiments. For example, in some embodiments, the WLCR can be a linear function of the WLR, which can be set based upon the characteristics of the physical media with which an SSD implemented. In some embodiments, the WLCR used at 224 can be the same as or different from the WLCR used at 210.

If it is determined at 224 that the DWC is less than (or less than or equal to) the WLCR, then process 200 loops back to 204 to wait for the next write trigger. Otherwise, if it is determined at 224 that the DWC is greater than or equal to (or greater than) the WLCR, then process 200 proceeds to 226.

At 226, process 200 increments the credit counter. Incrementing the credit counter can be performed in any suitable manner in some embodiments. For example, in some embodiments, one can be added to the value of the credit counter.

Next, at 228, process 200 decreases the DWC by the WLCR. Decreasing the DWC by the WLCR can be performed in any suitable manner in some embodiments. For example, in some embodiments, decreasing the DWC by the WLCR can be performed by subtracting from the value of the DWC the value of the WLCR.

Process 200 then branches to 216 and proceed as described above.

While positive counters (that is, counters that increase) for HWC, DWC, and credit count are described herein, and those counters are compared to positive thresholds WLCR and WDT, it should be apparent to one of ordinary skill in the art that counters that decrease can be used and that those counters can be compared to thresholds (or other values) that are lower that the initial values of the counters. For example, in some embodiments: at 208, 212, 222, and 226, the counters can be decremented (rather than incremented as shown in FIG. 2A); at 214, 228, and 218, the counters can be increased (rather than decreased as shown in FIG. 2A); and at 210, 224, and 216, the counters can be compared to determine if they are less than or equal to (or less than) the thresholds shown (or some fixed value based on the thresholds and the value to which the counters are initialized (e.g., a value equal to the initialization value of the counter minus the threshold)).

Figure 2B:
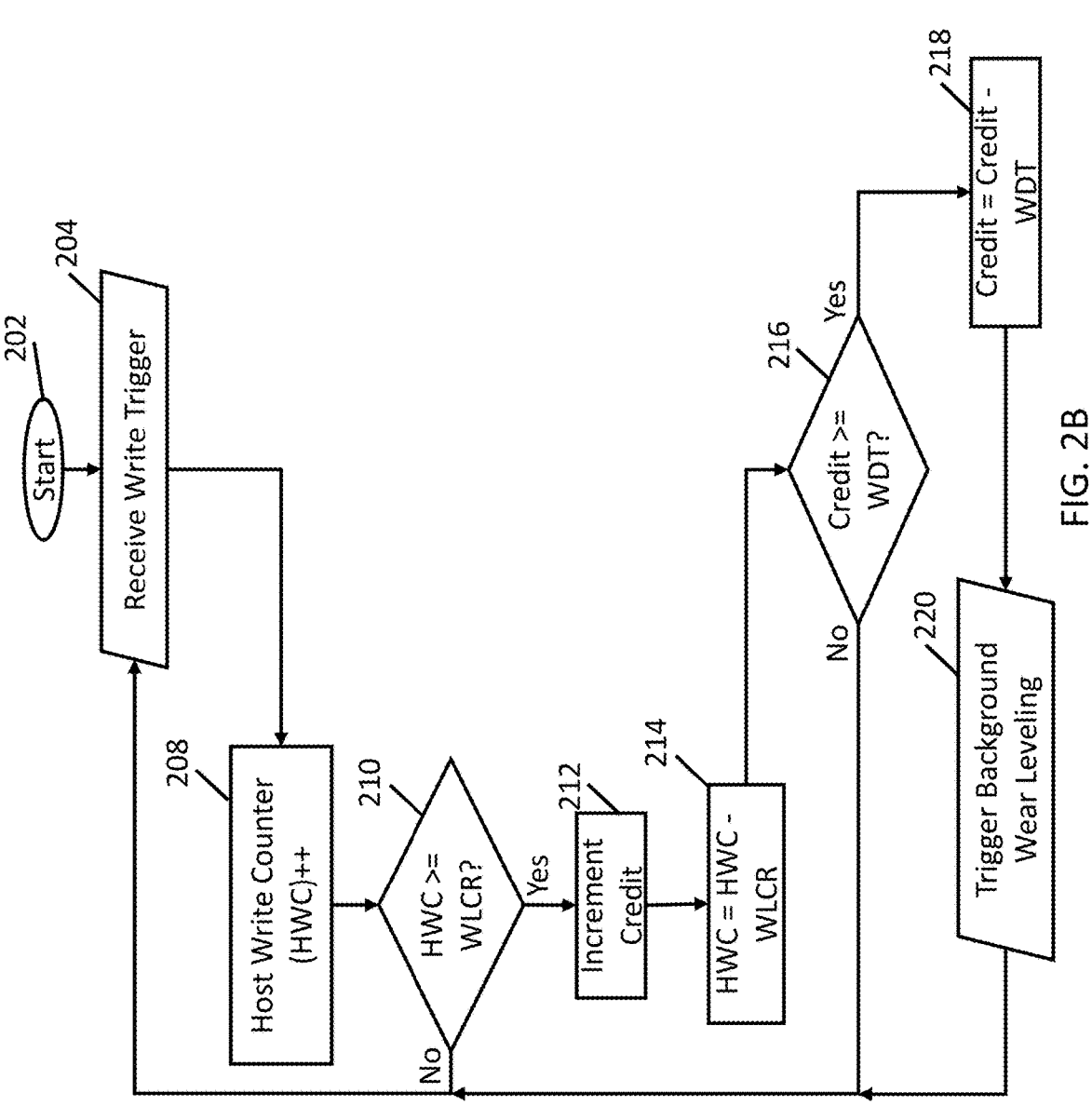
FIG. 2B is an example of a process for controlling background wear leveling based on a host write counter and a credit counter in response to receiving a write trigger in accordance with some embodiments.

In some embodiments, the operations shown in FIG. 2A with dashed boxes (i.e., 206, 222, 224, 226, and 228) can be omitted, and process 200 can proceed directly from 204 to 208. FIG. 2B illustrates an example 250 of such a process in some embodiments.

Figure 3:
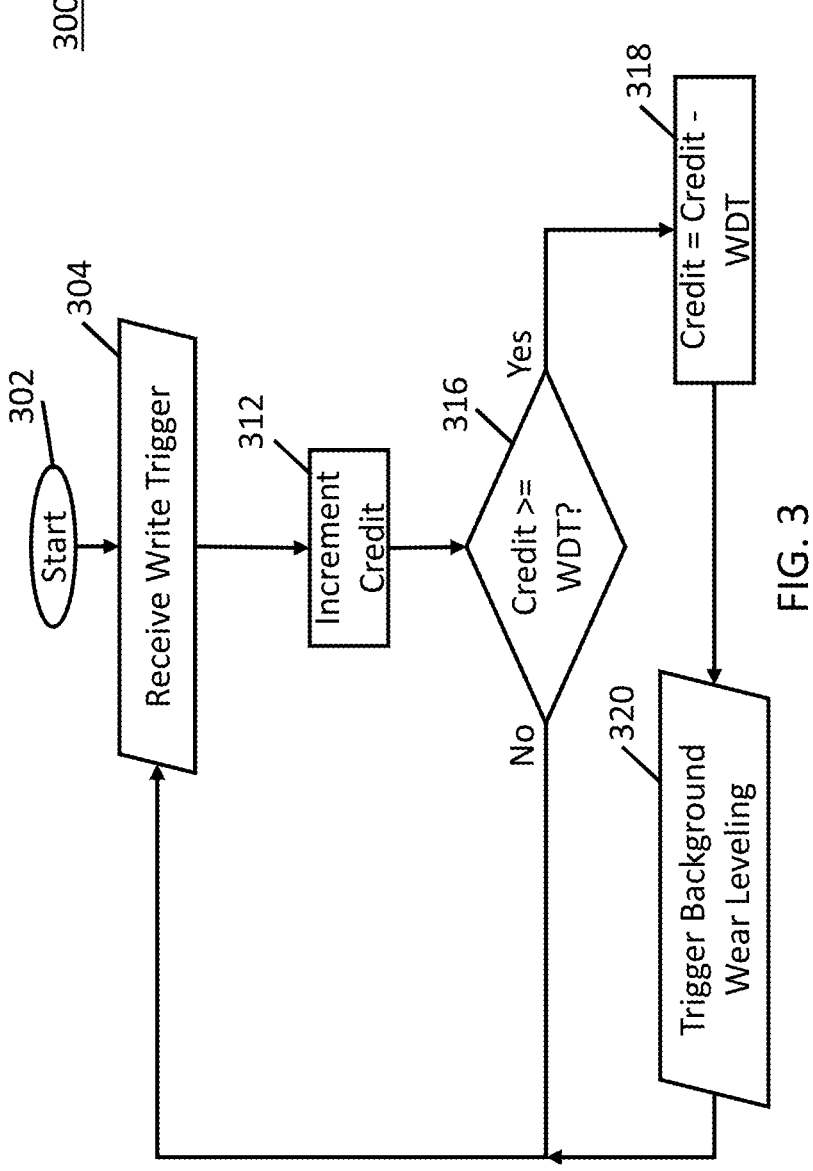
FIG. 3 is an example of a process for controlling background wear leveling based on a credit counter in response to receiving a write trigger in accordance with some embodiments.

Turning to FIG. 3, an example 300 of a process similar to that of FIG. 2B, but in which only one counter is used, is shown. In some embodiments, the process 300 can be modified by, for example, having steps rearranged, changed, added, and/or removed. As illustrated, process 300 includes 302, 304, 312, 316, 318, and 320, which can be the same as 202, 204, 212, 216, 218, and 220, respectively, of FIG. 2A, as described above, in some embodiments.

Figure 4:
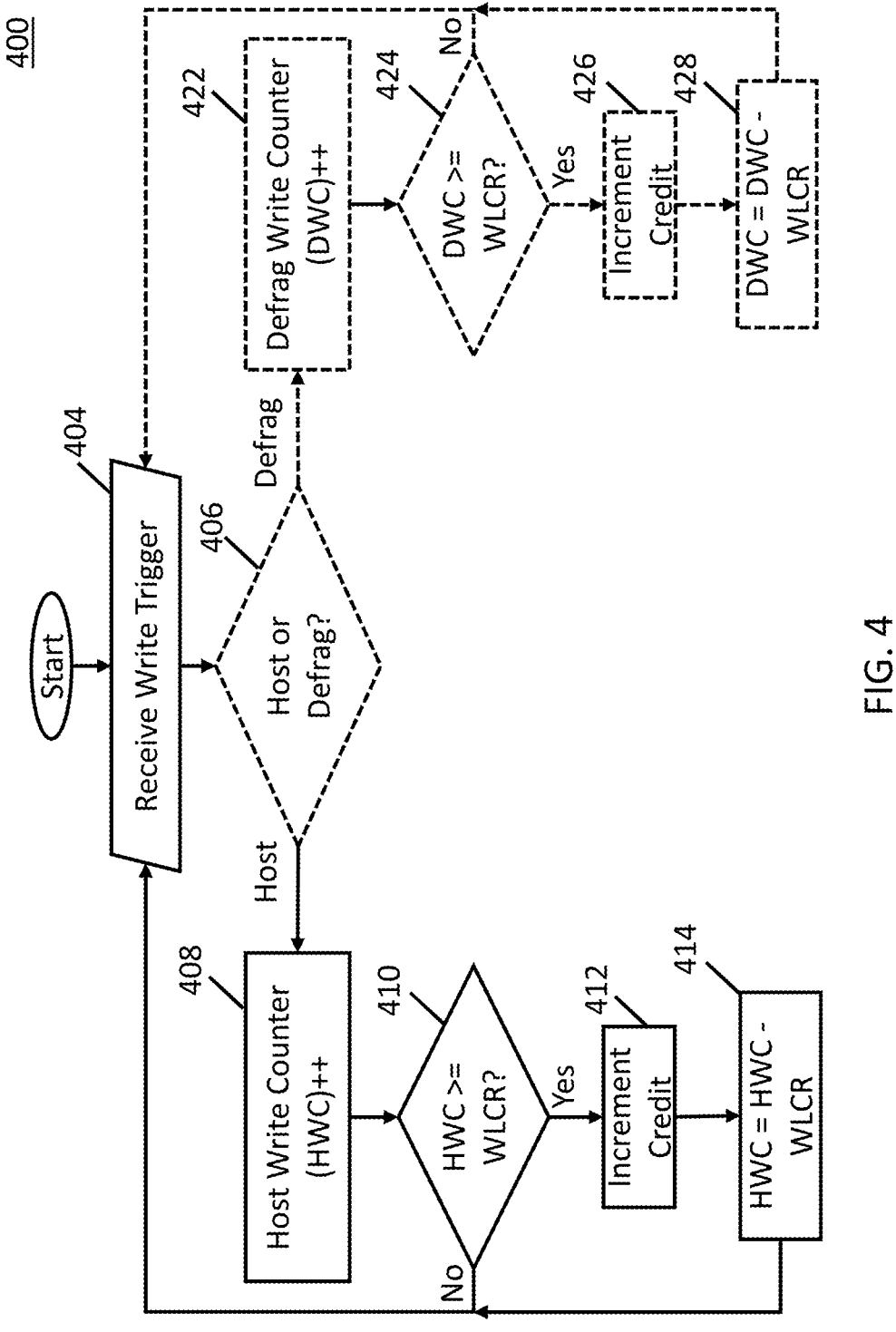
FIG. 4 is an example of a process for updating a host write counter and/or a defrag write counter and a credit counter in response to receiving a write trigger in accordance with some embodiments.
Figure 5:
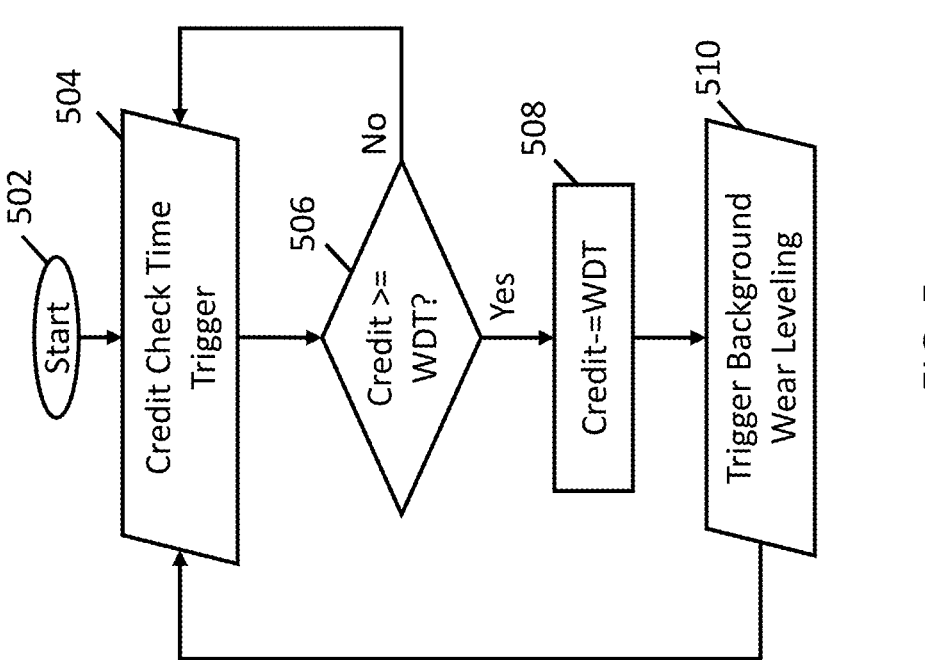
FIG. 5 is an example of a process for controlling background wear leveling based on a credit counter in response to a time trigger in accordance with some embodiments.

Turning to FIGS. 4 and 5, examples 400 and 500 of processes that each perform different parts of process 200 are illustrated.

As shown, process 400 of FIG. 4 includes 404, 406, 408, 410, 412, 414, 422, 424, 426, and 428 which can be the same as 204, 206, 208, 210, 212, 214, 222, 224, 226, and 228, respectively, of FIG. 2 as described above. In some embodiments, the process 400 can be modified by, for example, having steps rearranged, changed, added, and/or removed Similarly, process 500 of FIG. 5 includes 516, 518, and 520 which are the same as 216, 218, and 220, respectively, of FIG. 2 as described above. In some embodiments, the process 500 can be modified by, for example, having steps rearranged, changed, added, and/or removed.

After process 500 begins at 502, the process waits for and receives a credit check time trigger. The credit check time trigger can be generated in any suitable manner, such as by any suitable passage of time, in some embodiments. Then process 500 can perform 516, 518, and 520 in the same manner that 216, 218, and 220, respectively, of FIG. 2 are performed as described above.

In some embodiments, at least some of the above-described blocks of the processes of FIGS. 2-5 can be executed or performed in any order or sequence not limited to the order and sequence shown in and described in connection with the figures (e.g., 212 and 214 can be performed in the opposite order, and/or 226 and 228 can be performed in the opposite order, in some embodiments). Also, some of the above blocks of the processes of FIGS. 2-5 can be executed or performed substantially simultaneously where appropriate or in parallel to reduce latency and processing times in some embodiments (e.g., 212 and 214 can be performed at substantially the same time, and/or 226 and 228 can be performed at substantially the same time, in some embodiments). Additionally or alternatively, some of the above described blocks of the processes of FIGS. 2-5 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for controlling background wear leveling, comprising:
   memory; and
   at least one processor coupled to the memory and collectively configured to at least:
      change a first value in response to receiving a host write trigger;
      compare the first value to a first threshold;
      in response to the first value meeting the first threshold, change the first value by a first adjustment amount,
      change a second value in response to the first value meeting the first threshold;

compare the second value to a second threshold; and in response to the second value meeting the second threshold:

change the second value by a second adjustment amount; and trigger background wear leveling.

2. The system of claim 1, wherein the first adjustment amount is equal to an amount of the first threshold.

3. The system of claim 1, wherein the second adjustment amount is equal to an amount of the second threshold.

4. The system of claim 1, wherein the second threshold is based upon a page size and a number of planes of physical media of a solid-state drive.

5. The system of claim 1, wherein the at least one processor is also collectively configured to at least:

change a third value in response to receiving a defragmentation write trigger;

compare the third value to a third threshold; and in response to the third value meeting the third threshold:

change the third value by a third adjustment amount; and change the second value.

6. The system of claim 1, wherein the third adjustment amount is equal to an amount of the third threshold.

7. The system of claim 6, wherein the third threshold is the same as the first threshold.

8. The system of claim 1, wherein the at least one processor is also collectively configured to determine that a specific period of time has passed, wherein the comparing the second value to the second threshold is performed in response to determining that a specific period of time has passed.

9. A method for controlling background wear leveling, comprising:

changing a first value in response to receiving a host write trigger using a hardware processor;

comparing the first value to a first threshold;

in response to the first value meeting the first threshold, decreasing the first value by a first adjustment amount, increasing a second value in response to the first value meeting the first threshold;

comparing the second value to a second threshold; and in response to the second value meeting the second threshold:

decreasing the second value by a second adjustment amount; and triggering background wear leveling.

10. The method of claim 9, wherein the first adjustment amount is equal to an amount of the first threshold.

11. The method of claim 9, wherein the second adjustment amount is equal to an amount of the second threshold.

12. The method of claim 9, wherein the second threshold is based upon a page size and a number of planes of physical media of a solid-state drive.

13. The method of claim 9, further comprising:

changing a third value in response to receiving a defragmentation write trigger;

comparing the third value to a third threshold; and in response to the third value meeting the third threshold:

decreasing the third value by a third adjustment amount; and increasing the second value.

14. The method of claim 9, wherein the third adjustment amount is equal to an amount of the third threshold.

15. The method of claim 14, wherein the third threshold is the same as the first threshold.

16. The method of claim 9, further comprising determining that a specific period of time has passed, wherein the comparing the second value to the second threshold is performed in response to determining that a specific period of time has passed.

17. A non-transitory computer-readable medium containing computer executable instructions that, when executed by a processor, cause the processor to perform a method for controlling background wear leveling, the method comprising:

changing a first value in response to receiving a host write trigger;

comparing the first value to a first threshold;

in response to the first value meeting the first threshold, decreasing the first value by a first adjustment amount, increasing a second value in response to the first value meeting the first threshold;

comparing the second value to a second threshold; and in response to the second value meeting the second threshold:

decreasing the second value by a second adjustment amount; and triggering background wear leveling.

18. The non-transitory computer-readable medium of claim 17, wherein the first adjustment amount is equal to an amount of the first threshold.

19. The non-transitory computer-readable medium of claim 17, wherein the second adjustment amount is equal to an amount of the second threshold.

20. The non-transitory computer-readable medium of claim 17, wherein the second threshold is based upon a page size and a number of planes of physical media of a solid-state drive.

21. The non-transitory computer-readable medium of claim 17, wherein the method further comprises:

changing a third value in response to receiving a defragmentation write trigger;

comparing the third value to a third threshold;

in response to the third value meeting the third threshold:

decreasing the third value by a third adjustment amount; and increasing the second value.

22. The non-transitory computer-readable medium of claim 17, wherein the third adjustment amount is equal to an amount of the third threshold.

23. The non-transitory computer-readable medium of claim 22, wherein the third threshold is the same as the first threshold.

24. The non-transitory computer-readable medium of claim 17, wherein the method further comprises determining that a specific period of time has passed, wherein the comparing the second value to the second threshold is performed in response to determining that a specific period of time has passed.

* * * * *